United States Patent
Ogino

(10) Patent No.: US 10,082,449 B2
(45) Date of Patent: Sep. 25, 2018

(54) NUMERICAL CONTROLLER FOR CONTROLLING STROKE IN TEST OPERATION NEAR STROKE LIMIT

(71) Applicant: FANUC CORPORATION, Minamitsuru-gun, Yamanashi (JP)

(72) Inventor: Hideo Ogino, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 86 days.

(21) Appl. No.: 15/228,445

(22) Filed: Aug. 4, 2016

(65) Prior Publication Data
US 2017/0045881 A1 Feb. 16, 2017

(30) Foreign Application Priority Data
Aug. 10, 2015 (JP) .................................. 2015-158127

(51) Int. Cl.
G05B 19/4155 (2006.01)
G01M 99/00 (2011.01)
G05B 19/4061 (2006.01)

(52) U.S. Cl.
CPC ........ *G01M 99/008* (2013.01); *G05B 19/4061* (2013.01); *G05B 2219/49138* (2013.01); *G05B 2219/49141* (2013.01)

(58) Field of Classification Search
CPC ..... G05B 19/4155; G05B 2219/32344; G01M 99/008
See application file for complete search history.

(56) References Cited

U.S. PATENT DOCUMENTS

| 5,589,750 | A | 12/1996 | Idei et al. |
| 5,611,032 | A * | 3/1997 | Matsuura ........... G05B 19/4061 700/180 |
| 2008/0249653 | A1 | 10/2008 | Ichikawa |
| 2015/0045941 | A1* | 2/2015 | Mitsuhashi ........ G05B 19/4061 700/178 |
| 2015/0091898 | A1* | 4/2015 | Tanaka ............... G05B 19/4061 345/419 |

(Continued)

FOREIGN PATENT DOCUMENTS

| JP | 0236405 A | 2/1990 |
| JP | H 03-119407 A | 5/1991 |

(Continued)

OTHER PUBLICATIONS

Notification of Reasons for Refusal for Japanese Application No. 2015-158127, dated Sep. 19, 2017 with translation, 5 pages.

*Primary Examiner* — John Breene
*Assistant Examiner* — Mohammad Islam
(74) *Attorney, Agent, or Firm* — RatnerPrestia

(57) ABSTRACT

A numerical controller has a test mode of a machining program, sets, for each axis, a neighboring distance from a movement prohibition boundary of a tool or a workpiece, and temporarily stops an axis movement at a boundary of a near region thereof. A movable distance in a direction approaching the movement prohibition boundary is obtained for each axis such that the movable distance is less than a distance to the movement prohibition boundary. Further, if an axis exceeding the movable distance is present, an axis movement is stopped by restricting a movement distance within a range not exceeding the movable distance.

5 Claims, 8 Drawing Sheets

(56) References Cited

U.S. PATENT DOCUMENTS

| | | | |
|---|---|---|---|
| 2015/0205287 A1* | 7/2015 | Igarashi | B23Q 1/0045 |
| | | | 318/591 |
| 2015/0268661 A1* | 9/2015 | Ogawa | G05B 19/4097 |
| | | | 700/182 |
| 2015/0309501 A1* | 10/2015 | Ikegaya | G05B 19/4061 |
| | | | 700/186 |
| 2016/0031025 A1* | 2/2016 | Shirai | B23H 1/024 |
| | | | 219/69.13 |

FOREIGN PATENT DOCUMENTS

| | | |
|---|---|---|
| JP | H 06-75615 A | 3/1994 |
| JP | 06250717 A | 9/1994 |
| JP | H 06-282318 A | 10/1994 |
| JP | 0895623 A | 4/1996 |
| JP | 2006195862 A | 7/2006 |
| JP | 2008-257550 | 10/2008 |
| JP | 2013-125453 A | 6/2013 |

\* cited by examiner

NUMERICAL CONTROLLER FOR CONTROLLING STROKE IN TEST OPERATION NEAR STROKE LIMIT

BACKGROUND OF THE INVENTION

1. Field of the Invention

The present invention relates to a numerical controller for driving a machine tool, and particularly relates to a numerical controller capable of safely verifying validity of a machining program and a movement prohibition boundary by controlling a stroke when a test operation is performed near a stroke limit.

2. Description of the Related Art

Whether a machining program of a numerical controller that drives a machine tool executes an intended correct operation needs to be verified before driving the machine tool by actually operating the machine tool. Examples of an operation verification section of the machining program include a mode for performing a test operation represented by a single block operation of performing an operation for each directed block, moving and stopping a tool or a workpiece using one block as a unit, and verifying whether an intended correct operation is performed.

Meanwhile, when the machine tool is operated, there is a possibility that interference between the tool and a machine structure of the machine tool or a jig for fixing a workpiece to be machined may occur as a result of movement of the tool or a table to which the workpiece is attached. In order to avoid such an interference, a stroke limit function capable of setting a movement prohibition boundary of the tool is provided in the numerical controller. When the machine tool is driven by a new machining program in order to machine a different workpiece from that of a previous session, in general, the jig for fixing the workpiece to the machine tool is changed, and thus the movement prohibition boundary of the tool in the above-described stroke limit function needs to be changed.

When the different workpiece from that of the previous session is machined as described above, the machining program or the movement prohibition boundary of the tool is changed. Thus, an operator needs to more attentively perform an operation to proceed with a verification operation when checking a machining program in case of movement near the movement prohibition boundary such that interference between the machine structure or the jig and the tool does not occur due to a program instruction error or a region setting error. In this instance, the operator needs to gradually move the tool by lowering an override of a movement speed in order to avoid the above-described interference, and carefully perform an operation such that interference between the tool and the machine structure or the jig does not occur while putting an operator's hand on a stop button to be able to immediately stop the machine. For this reason, there are problems that a burden on the operator is great, and verification requires a lot of time.

Recently, as machine tools of multi-axis or multi-path type have widely been used and sophisticated numerical controllers have also been widely used, an operator's effort or operation time for verifying validity of machining programs is prone to increase. For this reason, an issue in a machining operation is to reduce time required for verification and lighten the burden on operators as much as possible.

JP 06-075615 A discloses a numerical controller for reading a machining program block by block at a set time interval and automatically executing the machining program in order to more smoothly perform an operator's verification operation when the machining program is verified by a test operation.

In the above numerical controller, an operation is automatically started at a certain time interval, which leads to a reduction in operator's effort to repeatedly press a start switch. However, since the stroke is not restricted, the operator needs to more attentively perform an operation to proceed with a verification operation such that interference between a jig or a machine structure of a machine tool and a tool does not occur in an operation near a stroke limit.

In addition, JP 06-282318 A and JP 2008-257550 A disclose a numerical controller that sets an amount of execution which produces a movement at a time in a test operation with the use of number of blocks designated, predetermined distance or time, as well as one unit of block.

The above numerical controller can set an amount of execution which produces a movement at a time in a test operation with the use of number of blocks designated, predetermined distance or time, as well one block. Therefore, an operator's effort to repeatedly press a start switch is reduced in a test operation to be carried out in a case where minute movement instruction blocks are continued as in a program for die machining. Conversely, in case of a machining program of non-minute block instructions, a movement distance can effectively be restricted to a certain amount. However, since a movement region is not designated, there is a possibility that a movement distance may be restricted even in a relatively safe region not near a stroke limit.

Meanwhile, JP 03-119407 A discloses a numerical controller that restricts movement within a specified area only to a predetermined unit movement amount.

The above numerical controller can restrict movement within a specified area only to a predetermined unit movement amount. However, the numerical controller cannot temporarily stop movement near a stroke limit, change a movable distance according to nearness to a movement prohibition boundary, or impose a restriction only on movement in a direction approaching the movement prohibition boundary. Therefore, it is insufficient as a measure in which an operator needs to attentively perform a verification operation.

Further, JP 2013-125453 A discloses a numerical controller that determines and displays an extent of an operation at which a stroke limit is exceeded when a machine tool is moved by a manual operation in order to allow an operator to perform an operation in a relaxed manner within a range not exceeding the stroke limit.

When a machine is manually operated, the above numerical controller can determine to which extent a manual feeding apparatus of the machine should be operated further until the stroke limit is exceeded, based on an operation amount of the manual feeding apparatus, and display the determination result. However, the numerical controller does not lighten an operator's verification operation when automatically operating the machine according to an instruction of a machining program.

SUMMARY OF THE INVENTION

In view of the above, an object of the invention is to reduce time necessary for verification while reducing a burden on an operator in verifying an operation and to safely verify validity of a machining program and a movement prohibition boundary by temporarily stopping a movement near a stroke limit and gradually reducing a movable distance as approaching the movement prohibition boundary, when a test operation of the machining program is performed.

A numerical controller of the invention controls a machine tool by relatively moving a tool and a workpiece based on an instruction of a machining program, and has a test mode of the machining program. The numerical controller includes: a neighboring distance setting section that sets, for each axis, a neighboring distance from a movement prohibition boundary of the tool or the workpiece; a neighboring boundary axis-stop section that temporarily stops, in the course of the test mode, an axis movement at a boundary of a near region determined based on the neighboring distance set by the neighboring distance setting section and the movement prohibition boundary; a movable distance calculation section that obtains, for each axis, a movable distance in a direction approaching the movement prohibition boundary such that the movable distance is less than a distance to the movement prohibition boundary, in the course of test mode and in an axis movement within the near region; a movement distance determination section that determines whether a movement distance of each axis moving in the course of the test mode exceeds the movable distance obtained by the movable distance calculation section; and an axis movement restriction section that stops an axis movement by restricting a movement distance within a range not exceeding the movable distance when an axis exceeding the movable distance is determined to be present.

The movable distance obtained by the movable distance calculation section may be set to m/n of the distance to the movement prohibition boundary, wherein m and n are integers, and m<n.

The movable distance calculation section may be configured to prevent a movement distance from being less than a predetermined distance by clamping the movable distance.

The movable distance calculation section may be configured to change the movable distance by applying an override based on an instruction or a signal to the movable distance.

The numerical controller may be configured such that a message is displayed when the axis movement is stopped by the neighboring boundary axis-stop section.

According to the invention, even when a new machining program is operated, or even when an operation is performed after a movement prohibition boundary of a tool is newly reset, it is easy to reduce a burden of verifying an operation by an operator's visual observation work, and to reduce time necessary for verification.

In addition, when an operation is performed near a movement prohibition boundary of a tool, a movement is automatically stopped before exceeding the movement prohibition boundary, and the stroke of an axis approaching the movement prohibition boundary is restricted inside a region near the movement prohibition boundary. Thus, an operator can more safely verify validity of a machining program and a movement prohibition boundary.

BRIEF DESCRIPTION OF THE DRAWINGS

The above-described and other objects and features of the invention will be clear from description of an embodiment below with reference to accompanying drawings. In the drawings.

DETAILED DESCRIPTION OF THE PREFERRED EMBODIMENTS

Figure 1:
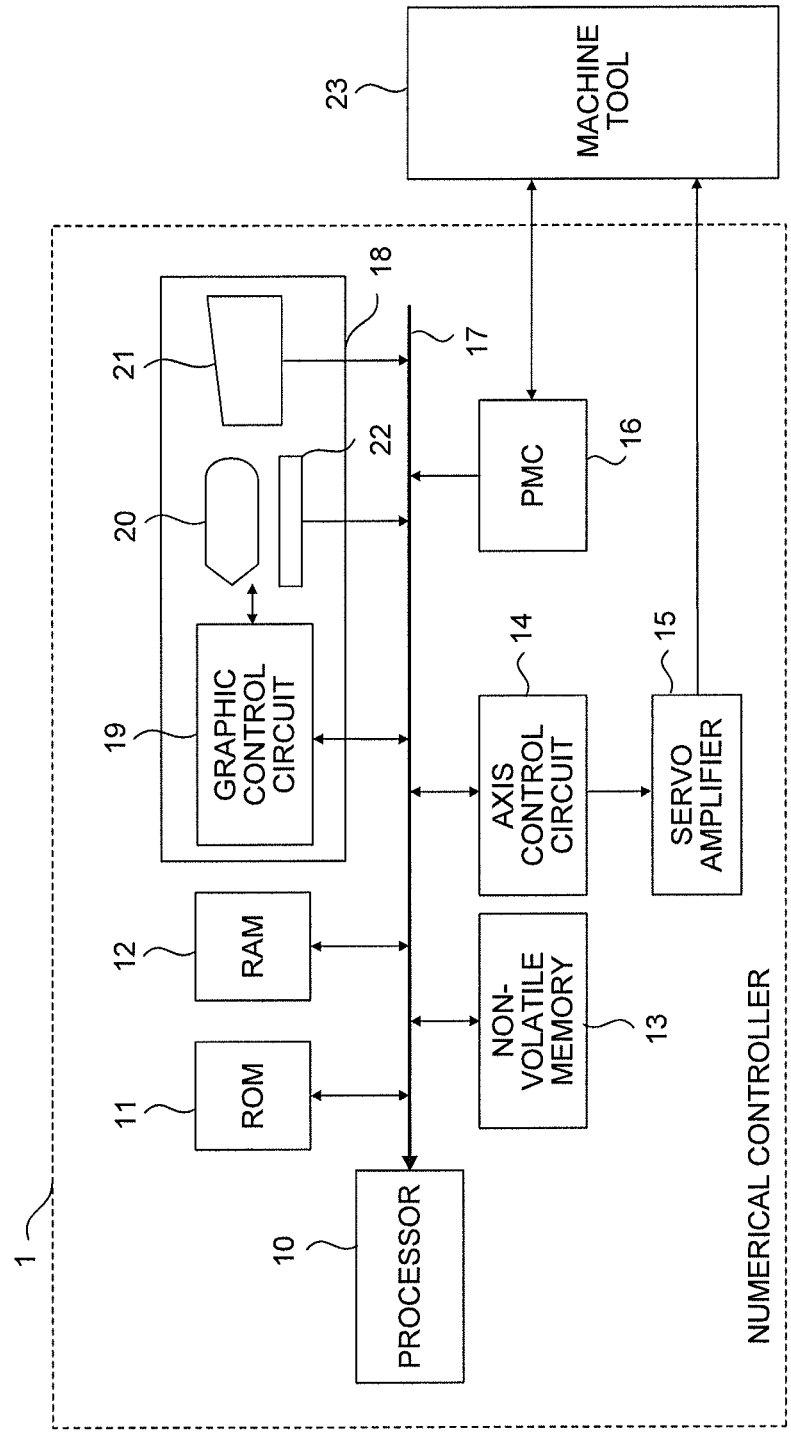
FIG. 1 is a block diagram illustrating a schematic configuration of hardware of a numerical controller according to an embodiment of the invention.

FIG. 1 is a block diagram illustrating a schematic configuration of hardware of a numerical controller according to the invention.

The numerical controller of FIG. 1 restricts the stroke in a test operation near a stroke limit, and is configured based on a processor 10. The processor 10 controls the whole numerical controller 1 according to a system program stored in a read-only memory (ROM) 11. An erasable programming ROM (EPROM) or an electrically erasable programmable ROM (EEPROM) is used as the ROM 11.

For example, a dynamic random access memory (DRAM) is used as a RAM 12 to store calculated data, display data, input/output signals, etc. which are temporary. A complementary metal-oxide semiconductor (CMOS) or a static random access memory (SRAM) backed up by a battery (not illustrated) is used as a non-volatile memory 13 to store a parameter, a machining program, tool compensation data, pitch error compensation data, and the like to be maintained after power is turned OFF. In addition, the non-volatile memory 13 stores determination data of a movement prohibition boundary in a stroke limit function or determination data of a region near a stroke limit.

A liquid crystal display/manual data input (LCD/MDI) device 18 is disposed in a front of the numerical controller 1 or at the same position as a machine operation panel, and is used to display data and a figure, input data, and operate the numerical controller 1. A graphic control circuit 19 converts a digital signal of numeric data, figure data, and the like into a raster signal for display and sends the converted raster signal to a display device 20. The display device 20 displays a numerical value and a figure thereof. An LCD is mainly used as the display device 20.

A key board 21 includes numeric keys, symbolic keys, letter keys, and function keys, and is used to create and edit a machining program and operate the numerical controller. A software key 22 is provided, for example, in a lower part of the display device 20, and a function thereof is displayed on the display device. When a picture of the display device 20 is changed, a function of the software key 22 is changed in response to a displayed function.

An axis control circuit 14 receives an instruction to move an axis from the processor 10, and outputs the instruction to move the axis to a servo amplifier 15. The servo amplifier 15 amplifies the instruction, drives a servomotor (not illustrated) coupled to a machine tool 23, and controls a relative movement of a tool with respect to a workpiece of the machine tool 23. Axis control circuits 14 and servo amplifiers 15, the number of which corresponds to the number of axes of the servomotor, are provided.

A programmable machine controller (PMC) 16 receives M (auxiliary) function signals, S (spindle speed control) function signals, T (tool selection) function signals, and the like from the processor 10 via a bus 17. In addition, the PMC 16 processes the signals using a sequence program, outputs an output signal, and controls pneumatic equipment, hydraulic equipment, an electromagnetic actuator, and the like inside the machine tool 23. Further, the PMC 16 receives a button signal, a switch signal, a limit switch signal, and the like of the machine operation panel inside the machine tool 23, performs sequence processing, and transmits a necessary input signal to the processor 10 via the bus 17.

A spindle motor control circuit, an amplifier for a spindle motor, and the like are omitted in FIG. 1.

Figure 2:
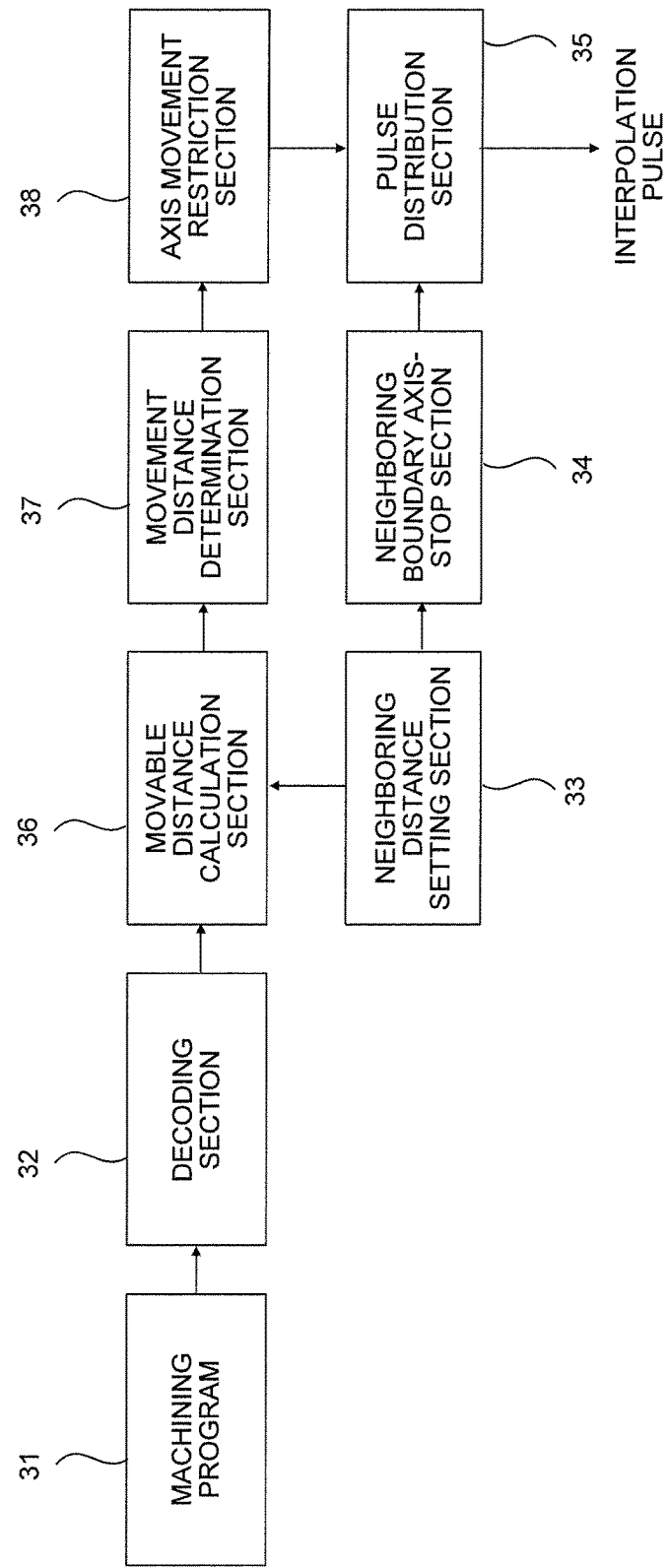
FIG. 2 is a block diagram illustrating a concept of a function included in the numerical controller of FIG. 1.

FIG. 2 is a block diagram illustrating a concept of a function, which is included in the numerical controller of FIG. 1, for restricting the stroke in a test operation near a stroke limit.

A decoding section 32 decodes a movement instruction of a block given by a machining program 31, and obtains an instruction endpoint by adding respective compensation values such as a tool diameter offset and a tool length offset.

A neighboring distance setting section 33 sets a neighboring distance from a movement prohibition boundary of a workpiece or a tool used in a stroke limit function for each axis, and stores the set neighboring distance. A neighboring boundary axis-stop section 34 instructs a pulse distribution section 35 to decelerate and stop an axis movement temporarily at a boundary of a region near a stroke limit determined from a set value stored by the neighboring distance setting section 33. When the axis movement is stopped by the neighboring boundary axis-stop section 34, the stoppage of the axis movement may be displayed on the display device 20.

Meanwhile, a movable distance calculation section 36 obtains a movable distance in a direction approaching a stroke limit prohibition region, in a test operation within the region near the stroke limit determined from the set value stored by the neighboring distance setting section 33, such that the movable distance is less than a distance to the movement prohibition boundary (for example, m/n of the distance to the movement prohibition boundary, where m and n are integers, and m<n) for each axis. A movement distance determination section 37 determines whether the stroke of each axis to the end point obtained by the decoding section 32 exceeds the movable distance obtained by the movable distance calculation section 36 in the test operation within the near region. When an axis exceeding the movable distance is determined to be present, the movement distance determination section 37 makes an axis movement restriction section 38 restrict a movement distance within a range not exceeding the movable distance, and then instructs the pulse distribution section 35 to decelerate and stop the axis movement.

The pulse distribution section 35 drives the servomotor coupled to the machine tool by sending an interpolation pulse according to the instruction to an axis control side.

Figure 3:
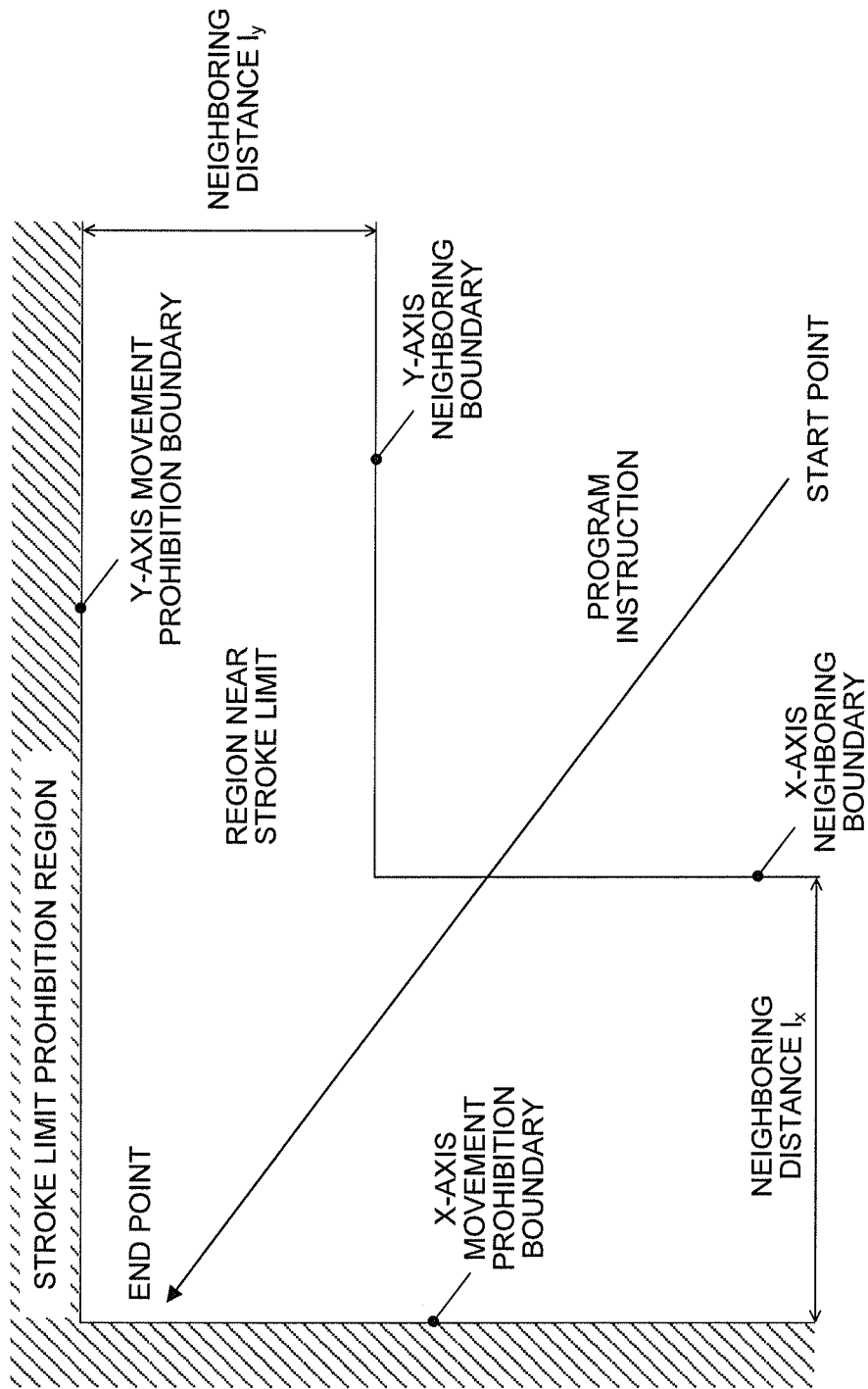
FIG. 3 is a diagram illustrating an example of an axis movement control operation when an instruction of a machining program approaches a region near a stroke limit.

FIG. 3 is a diagram illustrating an example of an axis movement control operation when an instruction of a machining program approaches a region near a stroke limit.

In FIG. 3, the "region near the stroke limit" is configured on an x-y plane by a neighboring distance $l_x$ in an x-axis direction and a neighboring distance $l_y$ in a y-axis direction from a "stroke limit prohibition region". FIG. 3 illustrates that an "instruction end point" is instructed within the "region near the stroke limit".

Figure 4:
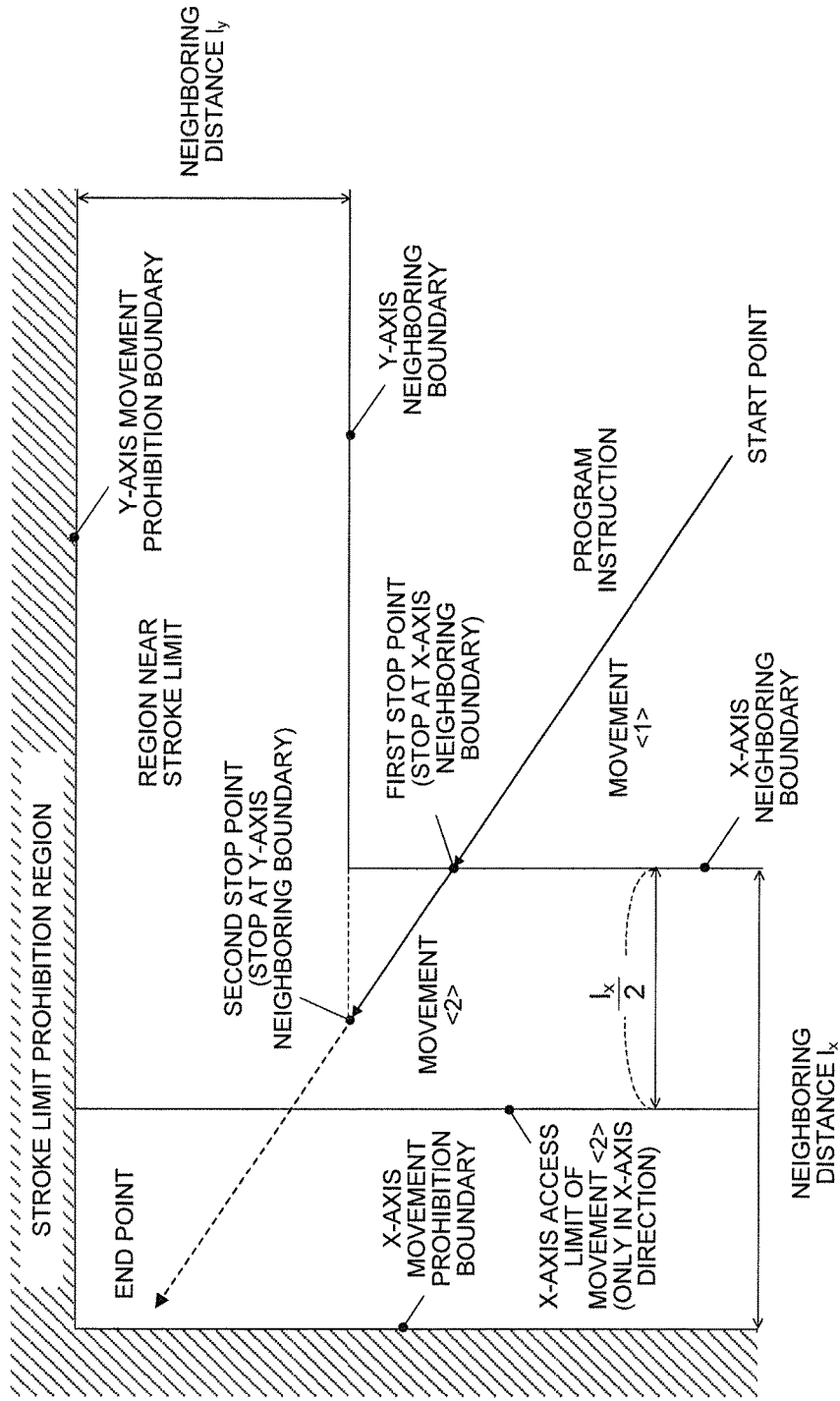
FIG. 4 is a diagram illustrating how first and second stop points are determined from a relation between the region near the stroke limit and the machining program illustrated in FIG. 3.
Figure 5:
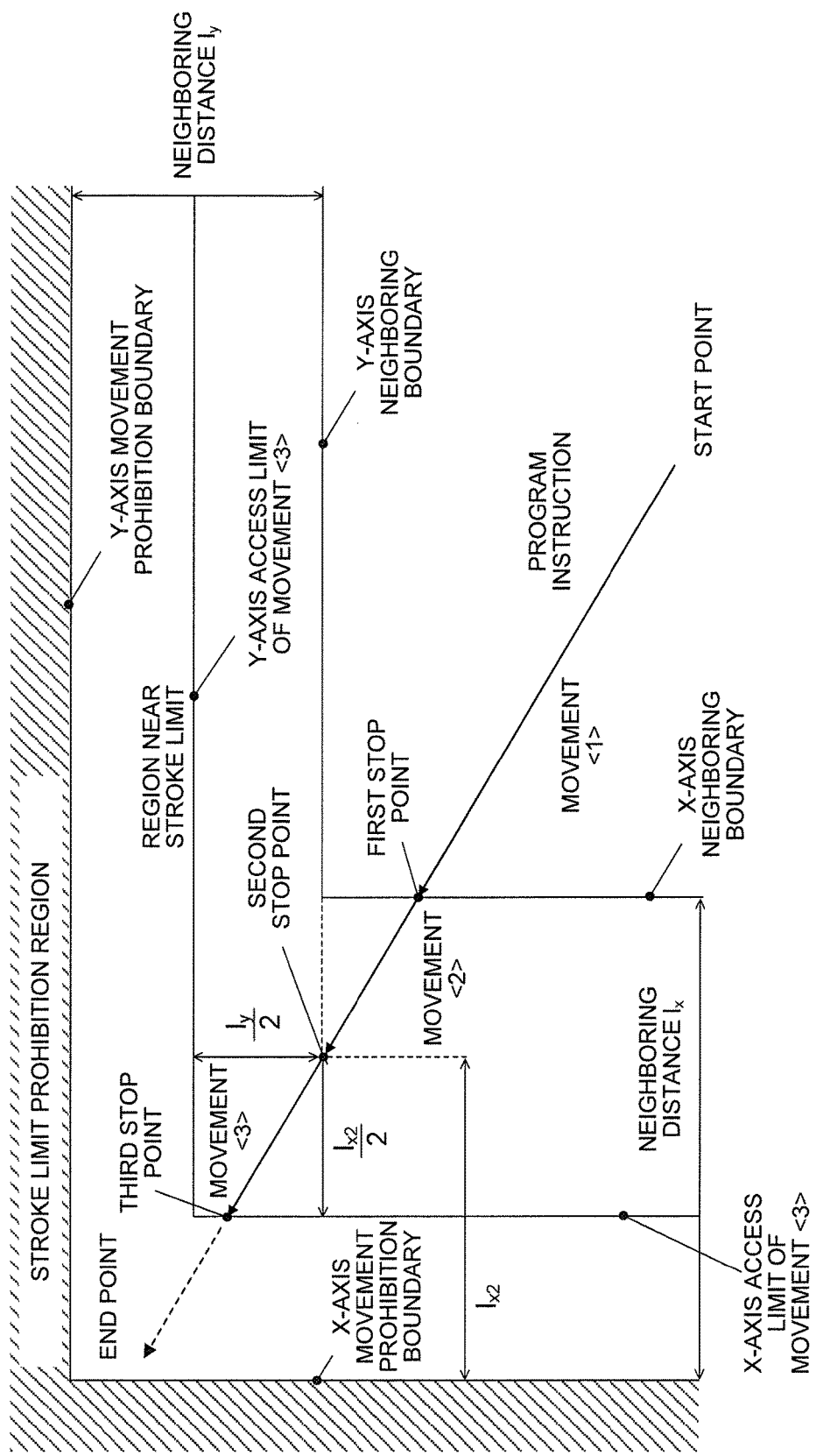
FIG. 5 is a diagram illustrating how a third stop point is determined after the first and second stop points illustrated in FIG. 4 are determined.

FIG. 4 and FIG. 5 illustrate how a subsequent stop point is determined from a relation between the machining program and the region near the stroke limit illustrated in FIG. 3.

FIG. 4 and FIG. 5 illustrate an embodiment in a case in which the movable distance calculation section 36 sets a distance movable in the direction approaching the prohibition region as a half of the distance to the movement prohibition boundary.

FIG. 4 illustrates that movement stops at a "an x-axis neighboring boundary" as a first stop point and at a "a y-axis neighboring boundary" as a second stop point when entering the "region near the stroke limit", by the neighboring boundary axis-stop section 34 in the machining program illustrated in FIG. 3. Upon entering the region near the stroke limit, first, movement stops at neighboring boundaries of respective axes.

In the machining program of FIG. 3, first, the tool passes through the "the x-axis neighboring boundary" in movement <1>, and thus a passing point at the x-axis neighboring boundary is set to the first stop point as illustrated in FIG. 4. In subsequent movement <2>, a distance in the x-axis direction (neighboring distance) from the first stop point to an x-axis movement prohibition boundary is $l_x$, and thus a maximum distance movable in the x-axis direction approaching from the first stop point to the stroke limit prohibition region is $l_x/2$. Meanwhile, the y-axis has not reached the y-axis neighboring boundary yet, and thus a movable point on the y-axis in subsequent movement <2> is at the "the y-axis neighboring boundary". In a machining program instruction, the y-axis neighboring boundary is reached in first (prior to an x-axis access limit of movement <2> illustrated in FIG. 4), and thus the second stop point becomes a passing point at the y-axis neighboring boundary.

FIG. 5 illustrates how a third stop point is determined by starting subsequent movement <3> from the second stop point illustrated in FIG. 4.

In subsequent movement <3>, a distance in the x-axis direction from the second stop point to the x-axis movement prohibition boundary is $l_{x2}$ as illustrated in FIG. 5, and thus a maximum distance movable in the x-axis direction approaching the movement prohibition boundary is $l_{x2}/2$. Meanwhile, a distance from the second stop point to the y-axis movement prohibition boundary in the y-axis direction is $l_y$, and thus a maximum distance movable in the y-axis direction approaching the movement prohibition boundary is $l_y/2$. In the machining program instruction, an "x-axis access limit of movement <3> illustrated in FIG. 5" is reached in first (prior to a y-axis access limit of movement <3> illustrated in FIG. 5), and thus the third stop point becomes a passing point at the x-axis access limit.

Although illustration is omitted after a fourth stop point, an access limit of each axis is determined by setting half the remaining stroke of each axis in the direction approaching the stroke limit prohibition region as a maximum value.

Figure 6:
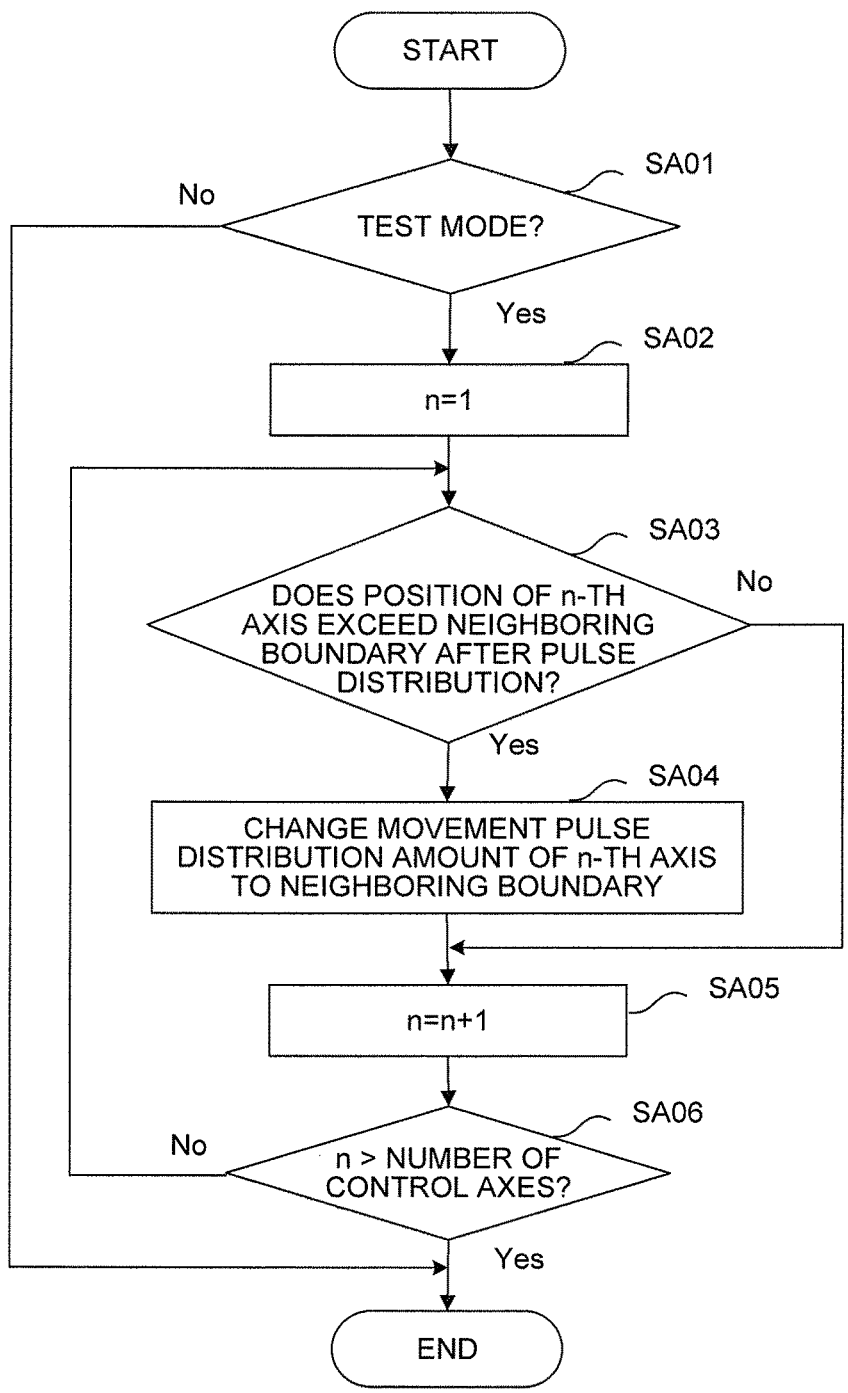
FIG. 6 is a flowchart illustrating a flow of processing executed by a neighboring boundary axis-stop section of the numerical controller illustrated in FIG. 2.

FIG. 6 is a flowchart illustrating a flow of processing executed in each control period by the neighboring boundary axis-stop section 34 of the numerical controller illustrated in FIG. 2. Hereinafter, a description will be given according to respective steps.

[Step SA01] It is determined whether a current operation mode is a test mode or not. The processing proceeds to step SA02 when the current operation mode is the test mode, and the present processing is terminated when the current operation mode is not the test mode.

[Step SA02] An axis number n is set to 1.

[Step SA03] It is determined whether a position of an n-th axis after distribution of movement pulses to each axis in a current control period exceeds a boundary (neighboring boundary) of the region near the stroke limit which is determined from the set value stored by the neighboring distance setting section 33. The processing proceeds to step SA04 when the position exceeds the neighboring boundary, and the processing proceeds to step SA05 when the position does not exceed the neighboring boundary.

[Step SA04] A movement pulse distribution amount of the n-th axis is changed to a movement pulse amount for movement to the neighboring boundary.

[Step SA05] The axis number n is updated to n+1.

[Step SA06] It is determined whether or not the axis number n exceeds the number of control axes to be controlled. The present processing is terminated when the axis number n exceeds the number of control axes, and the processing returns to step SA03 when the axis number n does not exceed the number of control axes.

Figure 7:
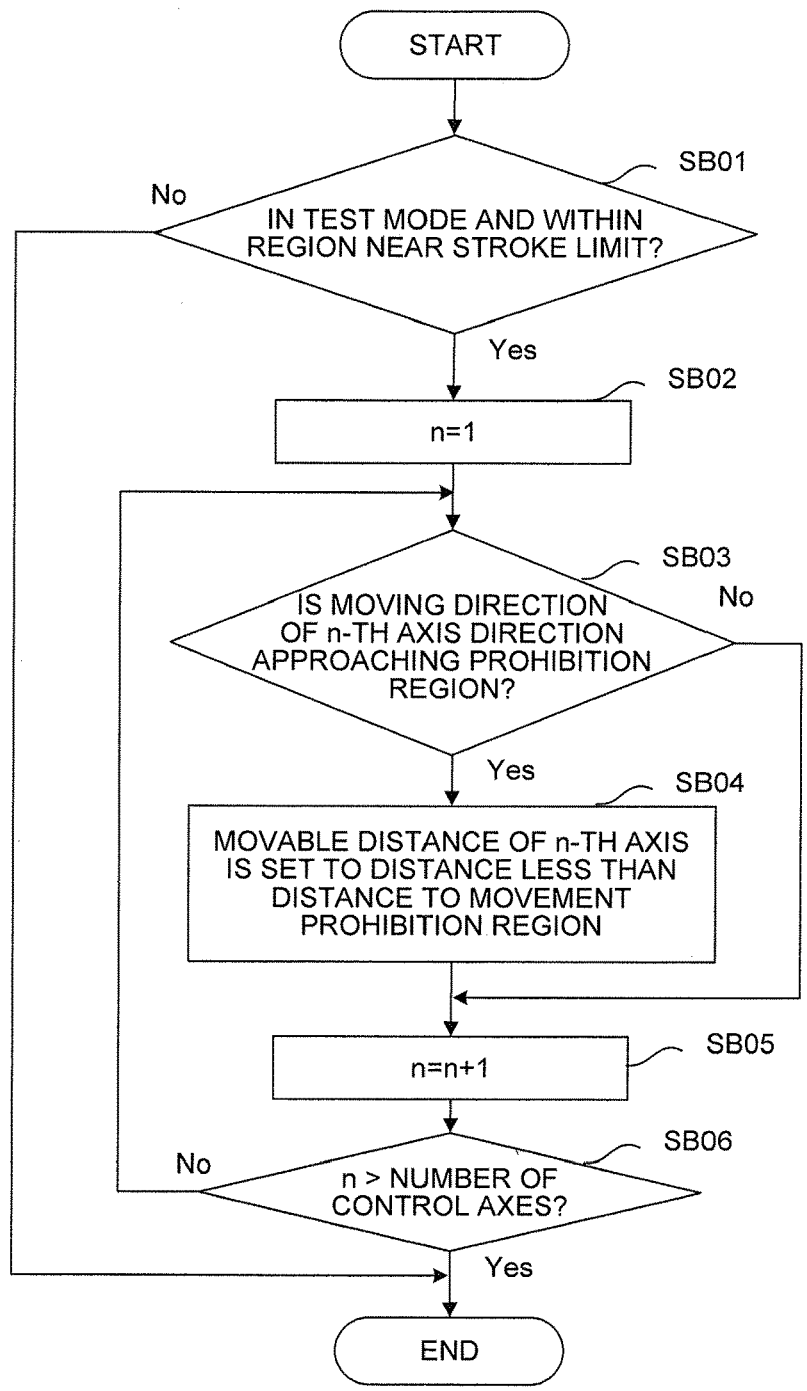
FIG. 7 is a flowchart illustrating a flow of processing executed by a movable distance calculation section of the numerical controller illustrated in FIG. 2.

FIG. 7 is a flowchart illustrating a flow of processing executed in each control period by the movable distance calculation section 36 of the numerical controller illustrated in FIG. 2. Hereinafter; a description will be given according to respective steps.

[Step SB01] It is determined whether a current operation mode is a test mode and further a current position of an axis is within the region near the stroke limit determined from the set value stored by the neighboring distance setting section 33. When the current operation mode is the test mode and the position is within the region near the stroke limit, the processing proceeds to step SB02, and otherwise, the present operation is terminated.

[Step SB02] An axis number n is set to 1.

[Step SB03] It is determined whether a direction in which an n-th axis moves is a direction approaching the prohibition region or not. The processing proceeds to step SB04 when the direction is the direction approaching the prohibition region, and the processing proceeds to step SB05 when the direction is not the direction approaching the prohibition region.

[Step SB04] A movable distance of the n-th axis is set to be a value being less than a distance to a boundary of a movement prohibition region (for example, half a distance to the movement prohibition region).

[Step SB05] The axis number n is updated to n+1.

[Step SB06] It is determined whether or not the axis number n exceeds the number of control axes to be controlled. The present operation is terminated when the axis number n exceeds the number of control axes, and the operation returns to step SB03 when the axis number n does not exceed the number of control axes.

Figure 8:
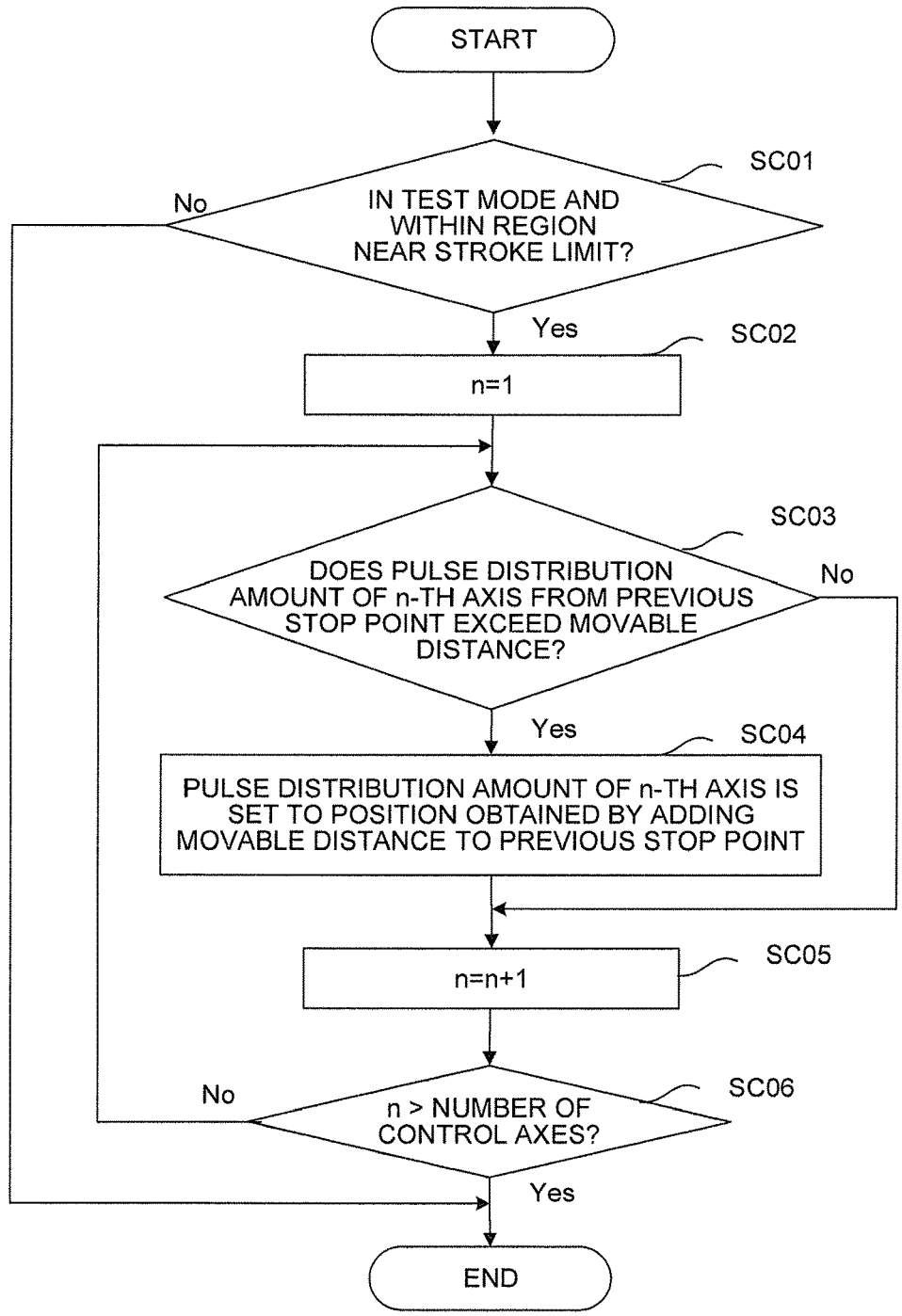
FIG. 8 is a flowchart illustrating a flow of processing executed by a movement distance determination section and an axis movement restriction section of the numerical controller illustrated in FIG. 2.

FIG. 8 is a flowchart illustrating a flow of processing executed in each control period by the movement distance determination section 37 and the axis movement restriction section 38 of the numerical controller illustrated in FIG. 2. Hereinafter, a description will be given according to respective steps.

[Step SC01] It is determined whether a current operation mode is a test mode and further a current position of an axis is within the region near the stroke limit determined from the set value stored by the neighboring distance setting section 33. When the current operation mode is the test mode and the position is within the near region, the processing proceeds to step SC02 and, otherwise, the present operation is terminated.

[Step SC02] An axis number n is set to 1.

[Step SC03] It is determined whether a distribution amount of movement pulses (including a distribution amount in a current control period) distributed to an n-th axis from a stop point at which movement stops in a previous session exceeds a movable distance of the n-th axis. The processing proceeds to step SC04 when the distribution amount exceeds the movable distance, and the processing proceeds to step SC05 when the distribution amount does not exceed the distance.

[Step SC04] The distribution amount of movement pulses of the n-th axis is changed to a movement pulse amount for movement to a position obtained by adding the movable distance to the stop point of the previous session.

[Step SC05] The axis number n is updated with n+1.

[Step SC06] It is determined whether the axis number n exceeds the number of control axes to be controlled. The present processing is terminated when the axis number n exceeds the number of control axes, and the operation returns to step SC03 when the axis number n does not exceed the number of control axes.

Hereinbefore, the embodiment of the invention has been described. However, the invention is not restricted only to examples of the above-described embodiment, and can be implemented in various modes by appropriately making modifications.

For example, even though the embodiment employs an example applied only to the biaxial x-y plane, an operation may be performed to spatially restrict the stroke with respect to any control axes. In addition, a machining program may be applied to a curved movement such as a circular arc in addition to a linear movement.

Further, the above embodiment shows an example in which the movable distance calculation section 36 determines the movable distance by setting half the remaining stroke of each axis in the direction approaching the prohibition region as a maximum value. However, in this case, when a test of a program instruction to move an axis to extremely near the prohibition region is conducted, there is a problem that the axis is stopped by the axis movement restriction section 38 many times to move the axis to a position instructed by the program instruction, and it takes time to conduct the test. In this regard, the above-mentioned problem can be solved by clamping the movable distance obtained by the movable distance calculation section 36 to prevent the movement distance from becoming less than a predetermined distance.

Furthermore, the movable distance calculation section 36 may be configured to apply an override in determining the movable distance based on an override value designated by an instruction or a signal. For example, in case where the movable distance calculation section 36 determines the movable distance by setting half the remaining stroke of each axis in the direction approaching the prohibition region as a maximum value as shown in the above embodiment, it may be required that the axis should more rapidly approach the prohibition region or attentively and slowly approach the prohibition region depending on tested machining programs or machining circumstances. In this case, if a designated override is applied when the movable distance calculation section 36 determines the movable distance, for example, the movable distance can be frequently changed in accordance with circumstances by an operator operating an override switch on a control panel.

The invention claimed is:

1. A numerical controller for controlling a machine tool by relatively moving a tool and a workpiece based on an instruction of a machining program, the numerical controller having a test mode of the machining program, the numerical controller comprising:
a motor control circuit; and
a processor configured to:
  a) set, for each axis, a neighboring distance from a movement prohibition boundary of the tool or the workpiece;
  b) control the motor control circuit to temporarily stop, in the course of the test mode, an axis movement at a boundary of a near region determined based on the neighboring distance and the movement prohibition boundary;
  c) obtain, for each axis, a movable distance in a direction approaching the movement prohibition boundary in the course of test mode and in an axis movement within the near region, wherein the movable distance is a fraction of the distance to the movement prohibition boundary;
  d) determine whether a movement distance of each axis moving in the course of the test mode exceeds the movable distance obtained;
  e) control the motor control circuit to stop the axis when the axis reaches the movable distance; and
  f) repeat steps (c)-(e) a predetermined number of times, each time steps (c)-(e) are repeated, the motor control circuit incrementally moves the machine tool closer to the movement prohibition boundary by the fraction of the movable distance.

2. The numerical controller according to claim 1, wherein the movable distance obtained by the movable distance calculation section is set to m/n of the distance to the movement prohibition boundary, wherein m and n are integers, and m<n.

3. The numerical controller according to claim 1, wherein the movable distance calculation section is configured to prevent the movement distance from being less than a predetermined distance by clamping the movable distance.

4. The numerical controller according to claim 1, wherein the movable distance calculation section is configured to change the movable distance by applying an override based on an instruction or a signal to the movable distance.

5. The numerical controller according to claim 1, wherein the numerical controller is configured to display a message when the axis movement is stopped by the neighboring boundary axis-stop section.

* * * * *